United States Patent [19]

LaRocca et al.

[11] Patent Number: 4,693,135

[45] Date of Patent: Sep. 15, 1987

[54] MANUALLY OPERABLE GEARSHIFT MECHANISM

[75] Inventors: William J. LaRocca, Sterling Heights; David M. Trush, Warren, both of Mich.

[73] Assignee: Wickes Manufacturing Company, Southfield, Mich.

[21] Appl. No.: 870,997

[22] Filed: Jun. 5, 1986

[51] Int. Cl.⁴ ............................................. G05G 7/00
[52] U.S. Cl. .................................. 74/473 R; 74/473 P
[58] Field of Search ................... 74/469, 473 R, 473 P

[56] References Cited

U.S. PATENT DOCUMENTS

| | | | |
|---|---|---|---|
| Re. 31,451 | 11/1983 | Osborn | 74/476 |
| 1,970,690 | 8/1934 | Churchill | 74/473 |
| 3,517,568 | 6/1970 | Payerle | 74/471 |
| 3,704,982 | 12/1972 | Hobbins | 74/473 R |
| 3,808,907 | 5/1974 | Yamaguchi | 74/471 XY |
| 3,974,711 | 8/1976 | Hurst, Jr. et al. | 74/473 R |
| 4,077,275 | 3/1978 | Kluge et al. | 74/473 R |
| 4,132,124 | 1/1979 | Iida | 74/473 R |
| 4,133,219 | 1/1979 | Kelbel et al. | 74/476 |
| 4,138,903 | 2/1979 | Burdette | 74/473 R |
| 4,143,560 | 3/1979 | Kinkade et al. | 74/473 R |
| 4,285,250 | 8/1981 | Iizuka et al. | 74/473 P |
| 4,324,149 | 4/1982 | Johannson et al. | 74/473 R |
| 4,328,712 | 5/1982 | Osborn | 74/476 |
| 4,333,360 | 6/1982 | Simmons | 74/473 P |
| 4,457,188 | 7/1984 | Hauser | 74/473 P |
| 4,459,870 | 7/1984 | Gill et al. | 74/471 XY |
| 4,493,224 | 1/1985 | Speelman | 74/473 R |
| 4,541,300 | 9/1985 | Kwiatkowski et al. | 74/473 R |
| 4,543,842 | 10/1985 | Katayama | 74/473 P |
| 4,583,417 | 4/1986 | Hurlow | 74/473 R |
| 4,612,820 | 9/1986 | Behrens | 74/473 R X |

Primary Examiner—Peter A. Aschenbrenner
Attorney, Agent, or Firm—Body, Vickers & Daniels

[57] ABSTRACT

An improved manually operable gearshift mechanism includes a support of sheet metal construction and a gearshift selector mounted on the support by a ball and socket arrangement for pivotal movement about first and second orthogonal axes. The gearshift selector is pivotal to a plurality of positions relative to the support to position a pair of gearshifting cables in positions corresponding to selectable transmission gears. The positioning of one of the gearshifting cables is achieved by a bellcrank pivotally mounted on the support and displaceable by a pin extending from the ball and displaceable about the second axis with the gearshift selector. Positioning of the other gearshifting cable is achieved by a link forming an extension of the gearshift selector below the first and second axes and which link is pivotal with the gearshift selector about the first axis. The link is pivotally interconnected with the gearshift selector so that the cable attached to the link is maintained substantially against lateral displacement during pivotal movement of the gearshift selector about the second axis.

27 Claims, 11 Drawing Figures

MANUALLY OPERABLE GEARSHIFT MECHANISM

BACKGROUND OF THE INVENTION

This invention relates to the art of gearshifting mechanisms and, more particularly, to improvements in manually operable gearshift mechanisms for shifting gears in a vehicle transmission.

It is well known that vehicle transmissions provide a plurality of selectable gear combinations, and it is likewise known that certain transmissions provide for the gears to be shifted from one combination to another through appropriate positioning of a pair of gearshift operators associated with the transmission and which are displaceable relative to one another and to the transmission housing by generally lineally displaceable gearshift actuators such as cables. The actuating cables are lineally displaced through the vehicle operator's manipulation of a manual gearshift mechanism in the vehicle and which mechanism includes a pivotal gear selector member having a plurality of positions corresponding to available gear combinations in the transmission. Pivotal displacement of the gear selector relative to a support therefor is translated to linear displacements of the cables and, in connection with the operation of an automobile for example, the gear combinations achieved through such positioning include a neutral gear, a reverse gear, and a plurality of forward drive gear ratios.

Manually operable gearshift mechanisms heretofore provided for achieving such transmission gear changes, while effective for the intended gearshifting purposes, are structurally complex and thus both excessively heavy and undesirably expensive to produce. More particularly in this respect, prior constructions have required the use of an excessive number of interengaging component parts, many of which require close tolerances and finished surfaces, thus involving time consuming and expensive machining operations and assembly operations. Moreover, such constructions are undesirably heavy as a result of the number of component parts and the size and weight thereof and, additionally, are undesirably large with respect to the outside dimensions thereof. Furthermore, structurally complex arrangements for translating motion within the gearshift mechanisms and for providing lockout arrangements with respect to unintentional shifting of the transmission into reverse gear, have added to the cost and weight of the mechanisms while, at the same time, taking away from the efficiency and stability of the mechanism with respect to the operation thereof.

Still further, the multiple position shifting of the gearshift selector in connection with the relative positioning of a pair of transmission gear actuators has heretofore required the lateral displacement within the support of one of the gear actuators relative to a linear path of reciprocating displacement therefor. Such lateral displacement is followed by longitudinal displacement of the actuator and, thus, bending thereof at the point where the actuator passes through the support toward the vehicle transmission. This bending of the actuator during longitudinal displacement thereof is undesirable in that it promotes wear of the actuator and the portion of the support slidably interengaged thereby. More importantly, from the standpoint of the vehicle operator, is the fact that such bending necessitates the use of varying degrees of force to displace the actuator depending on the extent of lateral displacement of the latter from its linear path. This, of course, is reflected in the "feel" of the shifting operation to the vehicle operator and results in a different feel for the various gearshifting movements of the gearshift selector.

SUMMARY OF THE INVENTION

In accordance with the present invention, the foregoing and other disadvantages of manually operable gearshift mechanisms heretofore provided are minimized or overcome by a construction comprised of fewer component parts than heretofore necessary and a structural interrelationship between component parts enabling a more economical production and assembly. At the same time, a construction according to the present invention provides a desired structural integrity for the mechanism, and a lightweight structurally compact unit with improved efficiency in operation.

In accordance with one aspect of the invention, the foregoing attributes are achieved by an improved structural arrangement for supporting a gearshift selector component and displacing gearshift actuators such as cables thereby. More particularly in this respect, the gearshift selector component is supported by a ball and socket arrangement which provides for the gearshift selector to be pivotal about first and second orthogonal axes. The gearshift selector includes a pin parallel to and preferably coaxial with the first axis and operable to pivot a bellcrank lever in response to pivotal movement of the gearshift selector about the second axis, thus to reciprocate one of the gearshift actuators attached to the bellcrank. In accordance with another aspect of the invention, the gearshift selector is interconnected with the second gearshift actuator such that pivotal displacement of the gearshift selector about the second axis minimizes lateral displacement of the second gearshift actuator relative to its linear path of reciprocation. This advantageously enables longitudinal displacement of the gearshift actuator without the bending thereof heretofore encountered and, thus, a uniform "feel" to the vehicle operator and shifting with less effort than that required with bending movement of the gearshift actuator.

It is accordingly an outstanding object of the present invention to provide improvements in connection with manually operable gearshift mechanisms for use with transmissions having a plurality of gear selections achieved through the relative positioning of a pair of gearshift actuators displaced in response to pivotal displacements of a gearshift selector component.

Another object is the provision of an improved gearshift mechanism of the foregoing character wherein transmission gear selection is achieved through the manipulation of a gearshift selector component supported for pivotal movement about a pair of orthogonal axes and provided with a pin parallel to one of the axes and operable to translate pivotal movement of the selector component about the other axis into reciprocable displacement of a corresponding gearshift actuator.

Still another object is the provision of an improved gearshift mechanism of the foregoing character in which the gear selector component is pivotally supported by means of a ball and socket arrangement and in which the pin is coaxial with the one axis and operable to pivot a bellcrank lever to achieve reciprocable displacement of the corresponding gearshift actuator.

Another object is the provision of an improved gearshift mechanism in which pivotal displacement of the gearshift selector component laterally about one of a pair of orthogonal axes and then longitudinally about the other axis results in linear displacement of a gearshift actuator substantially without lateral displacement of the actuator from its linear disposition with respect to the direction of reciprocation thereof.

Yet another object is the provision of an improved gearshift mechanism of the foregoing character wherein a gearshift actuator is interengaged with the gearshift selector through a link arrangement which enables pivotal movement of the gearshift selector laterally of the support while maintaining the gearshift actuator against lateral displacement relative to the support.

Yet a further object is the provision of an improved gearshift mechanism of the foregoing character comprised of a minimum number of component parts which are structured and structurally interrelated with one another in a manner which promotes economy in parts, production and assembly, and a compact, lightweight and efficiently operable gearshift mechanism.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which.

DESCRIPTION OF THE PREFERRED EMBODIMENT

Figure 1:
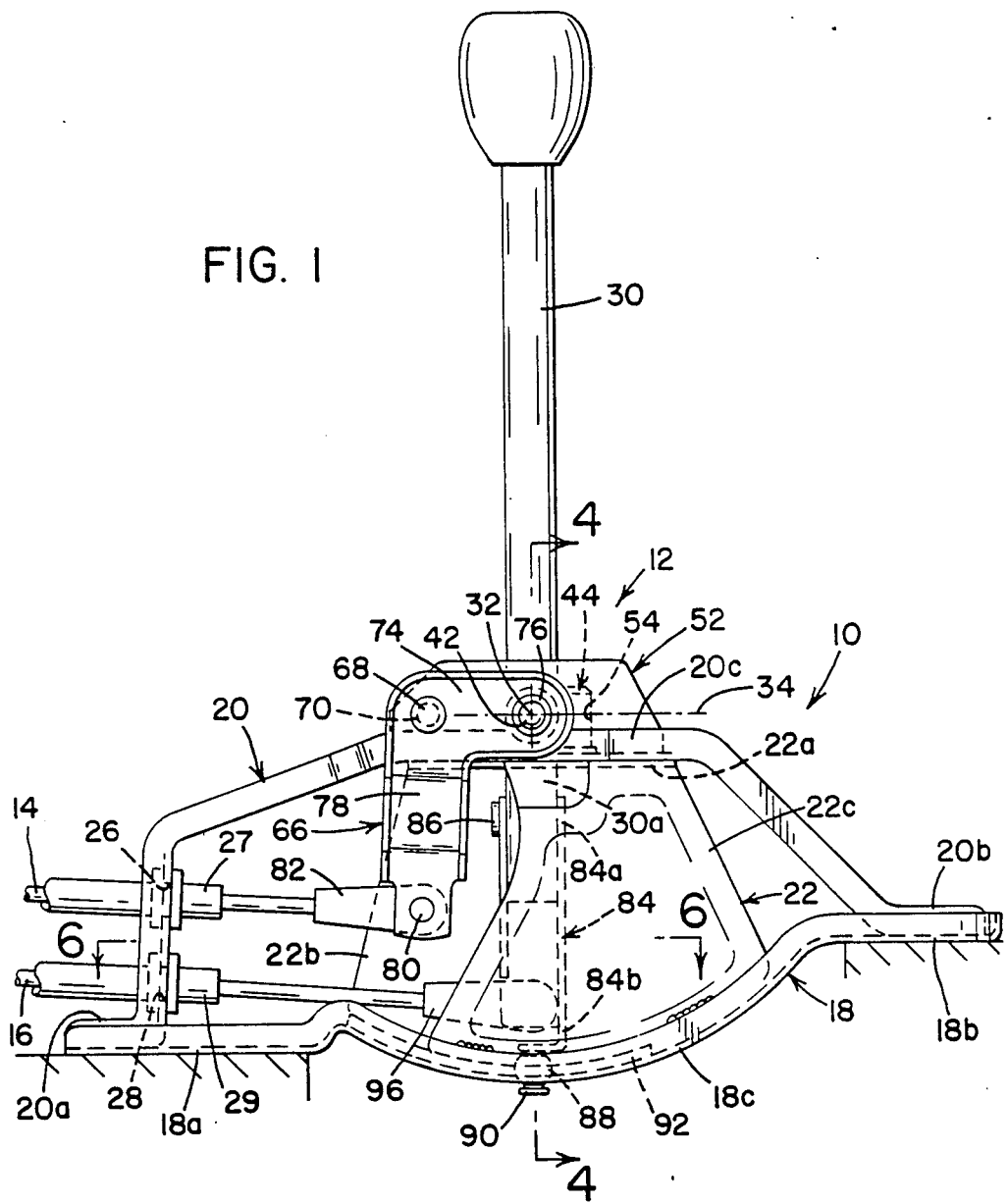
FIG. 1 is a side elevation view of a gearshifting mechanism in accordance with the present invention.
Figure 2:
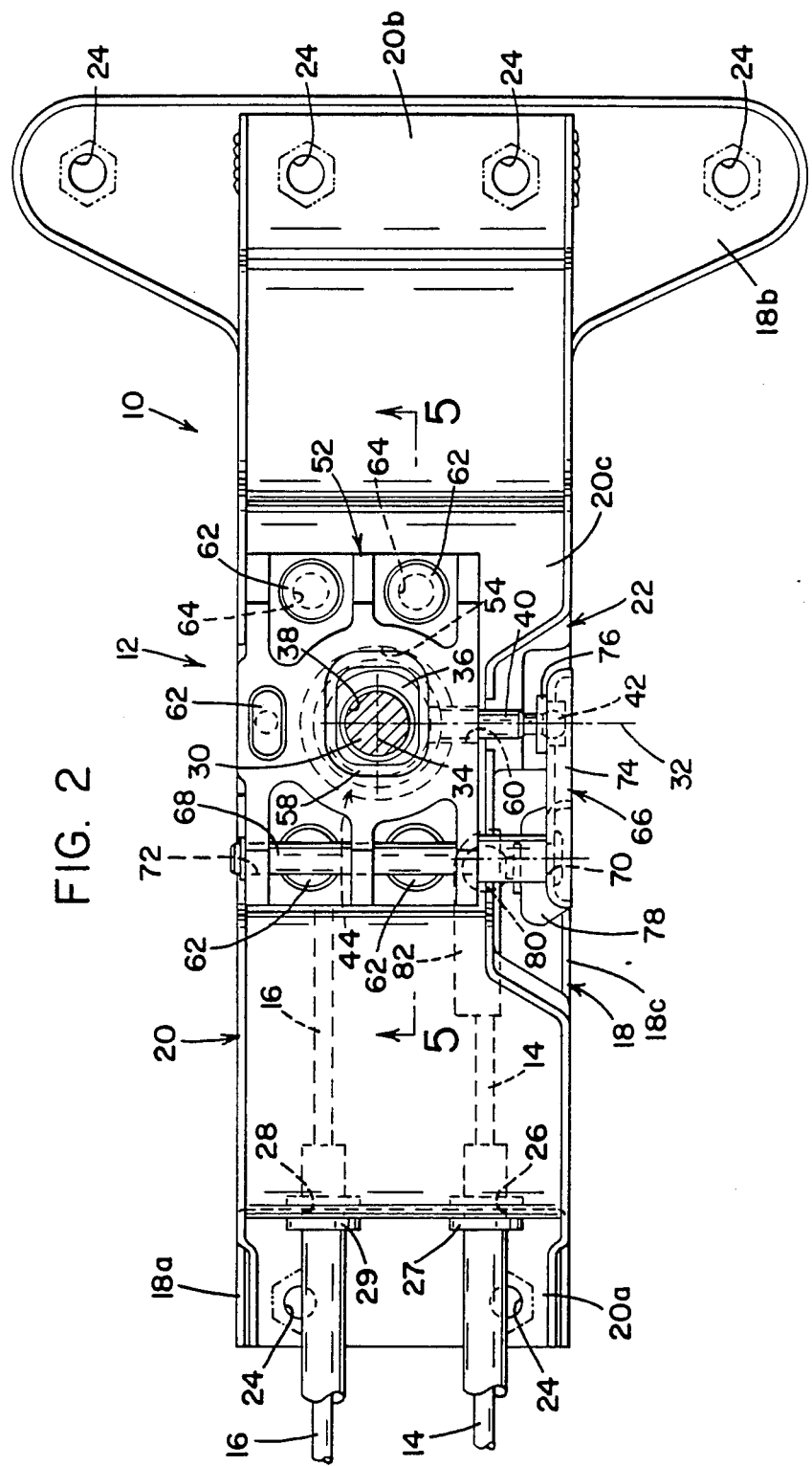
FIG. 2 is a plan view of the gearshifting mechanism.

Referring now in greater detail to the drawings wherein the showings are for the purpose of illustrating preferred embodiments of the invention only and not for the purpose of limiting the invention, a gearshifting mechanism according to the present invention is shown in FIGS. 1-7 as including a support 10, a gearshift selector mechanism 12 and a pair of gearshift actuators 14 and 16, such as cables. Support structure 10 is of sheet metal construction and is comprised of a bottom member 18, a top member 20 and a side member 22. Bottom member 18 has front and rear ends 18a and 18b, respectively, and an arcuate intermediate portion 18c. Top member 20 is of generally inverted U-shape between front and rear ends 20a and 20b thereof, which ends respectively overlie ends 18a and 18b of bottom member 18 and are secured thereto such as by welding. Intermediate portion 20c of top member 20 is spaced above and generally overlies intermediate portion 18c of the bottom member. Side member 22 of the support is of generally inverted U-shape and comprises a bridging portion 22a underlying intermediate portion 20c of top member 20, and downwardly extending legs 22b and 22c along laterally opposite sides of bridge portion 22a and having arcuate lower ends secured to intermediate portion 18c of bottom member 18 such as by welding. The longitudinally opposite ends of the support as defined by the front and rear ends of the bottom and top members thereof are provided with a plurality of openings 24 which facilitate mounting of the gearshift mechanism on a vehicle. Top member 20 includes an upstanding wall portion adjacent the front end 20a thereof provided with openings 26 and 28 respectively receiving cables 14 and 16 which are supported in the openings by corresponding cable guide components 27 and 29.

Figure 7:
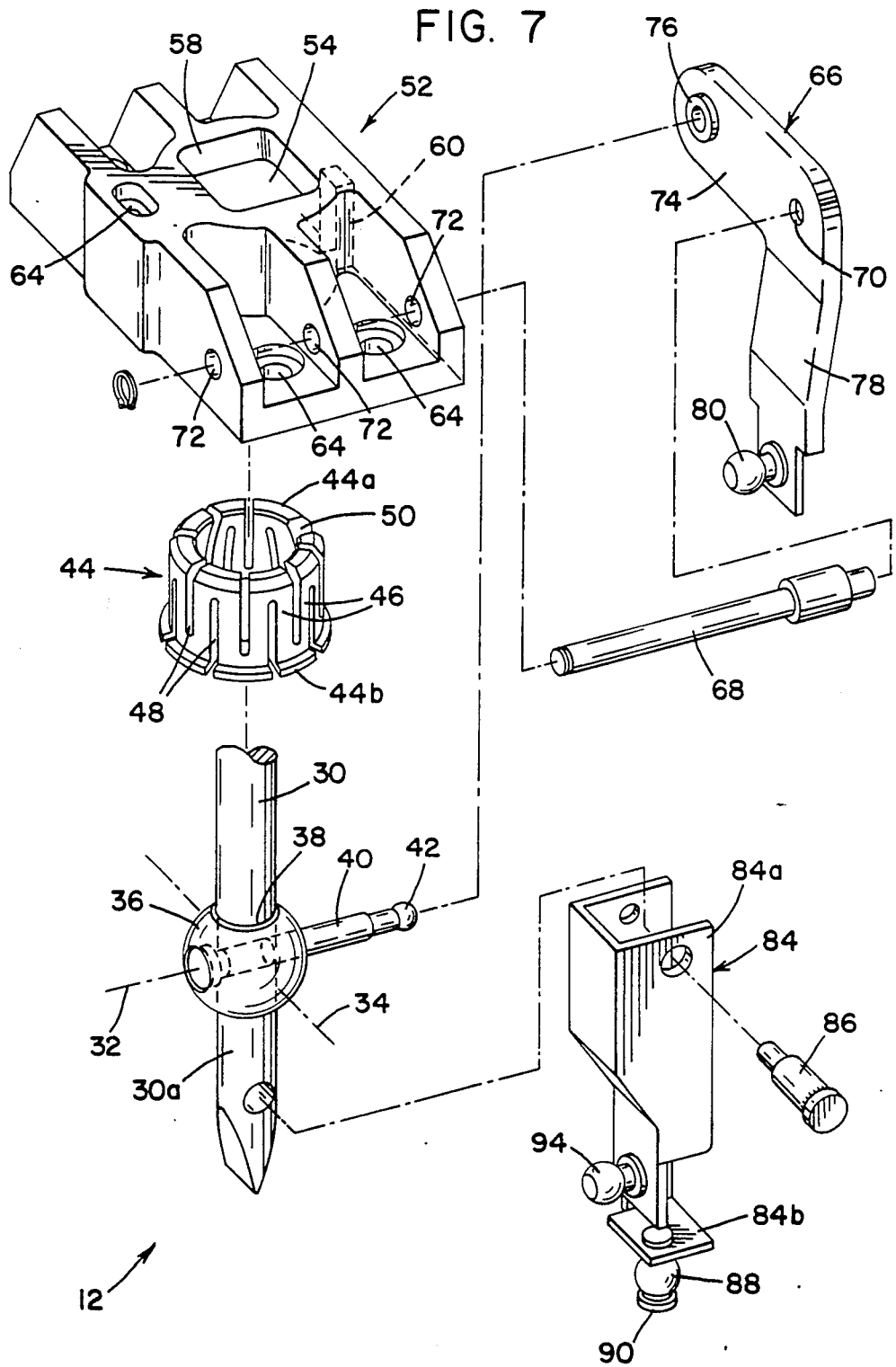
FIG. 7 is an exploded view of the gearshift lever and the component parts of the ball and socket joint therefor.

In accordance with one aspect of the invention, gearshift selector mechanism 12 includes a gearshift lever 30 which can be solid or tubular in cross-section and which is mounted on the upper end of support 10 for pivotal movement about a first axis 32 extending laterally of the support and a second axis 34 extending longitudinally of the support and which is perpendicular to and intersects axis 32. A ball member 36 is provided with an opening 38 through which gearshift lever 30 extends, and the ball and lever are staked together by means of a pin 40 extending laterally therethrough and having a ball shaped outer end 42 laterally adjacent leg 22c of side member 22 for the purpose set forth hereinafter. Ball 36 is received in an annular ball cage member 44 which provides a socket supporting the ball and thus lever 30 for pivotal displacement about axes 32 and 34. Ball cage 44 is preferably produced from a suitable plastic material such as Delrin and as best seen in FIG. 7, has upper and lower ends 44a and 44b, respectively, and a periphery defined by axially extending legs 46 circumferentially separated by axially extending slots 48. Circumferentially adjacent ones of the legs 46 are alternately connected together at the opposite ends of the cage, whereby slots 48 are closed at one end and have opposite ends which alternately open through the opposite ends of the cage. The inner surfaces of legs 46 are arcuately contoured for mating engagement with the outer surface of ball 36, and the cage is provided with an axially extending slot 50 which is circumferentially wider than slots 48 and is provided to accommodate pin 40 and to permit pivotal movement of ball 36 and pin 40 about axis 34.

When ball 36 is received in cage 44, the latter assembly is adapted to be mounted on support 10 by means of a ball and socket housing member 52 which preferably is of a suitable plastic material such as Delrin. Housing member 52 is provided with a recess 54 in the underside thereof to accommodate cage 44, and intermediate portion 20c of top member 20 of the support and bridging portion 22a of the side member of the latter are provided with an opening 56 therethrough receiving the lower portion 30a of lever 30. The upper or inner end of recess 54 in housing member 52 is provided with an opening 58 to accommodate the upper end of lever 30, and the housing member is provided with a slot 60 in one side thereof to receive pin 40 and to accommodate displacement of pin 40 in response to pivotal movement of lever 30 about axis 34. When ball 36 and cage 44 are assembled and introduced into recess 54 of housing member 52, the latter is secured to portions 20c and 22a of the support structure means of a plurality of fasteners 62 such as rivets extending through openings 64 in the housing member and corresponding openings in support portions 20c and 22a.

Gear selector mechanism 12 further includes a bellcrank lever 66 pivotally mounted on housing 52 by means of a pin 68 which is spaced from and parallel to axis 32. Pin 68 extends laterally through an opening 70 in the bellcrank and openings 72 on laterally opposite sides of housing 52. Bellcrank 66 has a first leg 74 extending generally horizontally from pin 68 and provided on its outer end with a bushing 76 receiving ball shaped end 42 of pin 40. A second leg 78 of the bellcrank extends downwardly from pin 68 and has a ball pin 80 staked to the lower end thereof and to which cable 14 is attached by means of a socket member 82.

In accordance with another aspect of the invention, the gear selector mechanism 12 further includes a gearshift lever extension member or link 84 of sheet metal construction having upper and lower ends respectively interengaged with gearshift lever 30 and the bottom of support 10 to control displacements of cable 16 in response to pivotal displacements of lever 30 about axes 32 and 34. More particularly, upper end 84a of link 84 is pivotally interconnected with lower end 30a of gearshift lever 30 by means of a pin 86 which provides a pivot axis between the gearshift lever and extension member extending longitudinally of the support structure and parallel to axis 34. Lower end 84b of link 84 is provided with a ball element 88 staked thereto by means of a pin 90, and arcuate intermediate portion 18c of bottom member 18 of the support is provided with a longitudinally extending guide slot 92 receiving ball 88 for the purpose set forth hereinafter. Link member 84 is further provided with a laterally projecting ball pin 94 staked thereto and to which cable 16 is attached by means of a socket member 96. Accordingly, it will be appreciated that link member 84 and ball pin 94 thereon connect cable 16 to the gearshift lever and that ball pin 94 provides a point of connection for the cable which is spaced below axis 32.

It will be appreciated from the foregoing description of the component parts of the gearshift mechanism that pivotal displacement of gearshift lever 30 in opposite directions about first axis 32 results in longitudinal reciprocating displacement of cable 16 relative to support 10. In this respect, link pin 86 causes link member 84 to pivot with gearshift lever 30 about axis 32. It will likewise be appreciated that pivotal displacement of gearshift lever 30 in opposite directions about second axis 34 results in pivotal displacement of pin 40 about the latter axis, whereby outer end 42 of the pin is displaced vertically to impart pivotal movement of bellcrank 66 about pin 68. Thus, leg 78 of the bellcrank is displaced longitudinally to reciprocate cable 14 relative to the support.

In connection with pivotal displacement of gearshift lever 30 about first axis 32, ball 88 on the lower end of link member 84 slides longitudinally in guide slot 92 and prevents lateral displacement of the link member about pin 86 during such displacement about axis 32. Thus, reciprocating displacement of cable 16 is along a linear path relative to the support. Importantly, link member 84, the pivotal connection thereof to the gearshift lever, and the sliding engagement thereof relative to the bottom of the support provides for pivotal displacement of gearshift lever 30 in opposite directions about second axis 34 to be achieved with minimal lateral displacement of cable 16 relative to opening 28 in the support. More particularly, as will be best appreciated from FIG. 4, link member 84 functions similar to a toggle link between the support and gearshift lever 30, whereby ball pin 94 which provides the point of connection for cable 16 is maintained substantially against lateral displacement in response to pivotal displacement of gearshift lever 30 about axis 34. In this respect, for example, pivotal displacement of gearshift lever 30 clockwise about axis 34 in FIG. 4 results in counterclockwise pivotal displacement of link member 84 relative to ball 88 at the lower end thereof. It will be appreciated that this results in minimal displacement of ball pin 94 and thus cable 16 relative to the support structure. In fact, displacement of lever 30 in opposite directions about axis 34 results in a total angular displacement of cable 16 relative to opening 28 of less than 2°. In comparison, a rigid extension of lower end 30a of the gearshift lever to a location close to the bottom member of the support and the connection of cable 16 to the gearshift lever at that point would result in lateral displacement of cable 16 relative to opening 28 in the support of more than 15° in response to pivotal displacement of gearshift lever 30 in opposite directions about axis 34. Such lateral displacement of the cable from a position aligned with opening 28 in the support structure through which the cable extends results in bending of the cable as it passes through the opening, whereby the ensuing pivotal displacement of gearshift lever 30 about axis 32 requires the cable to progressively bend as it moves longitudinally through the opening. This induces wear on the cable and guide component therefor and, additionally, requires more force and thus a difference in "feel" during the various gearshifting operations. These problems are advantageously avoided through the use of link 84 and, additionally, the latter enables reducing the width of the support heretofore required to accommodate lateral displacement of the cable.

Figure 3:
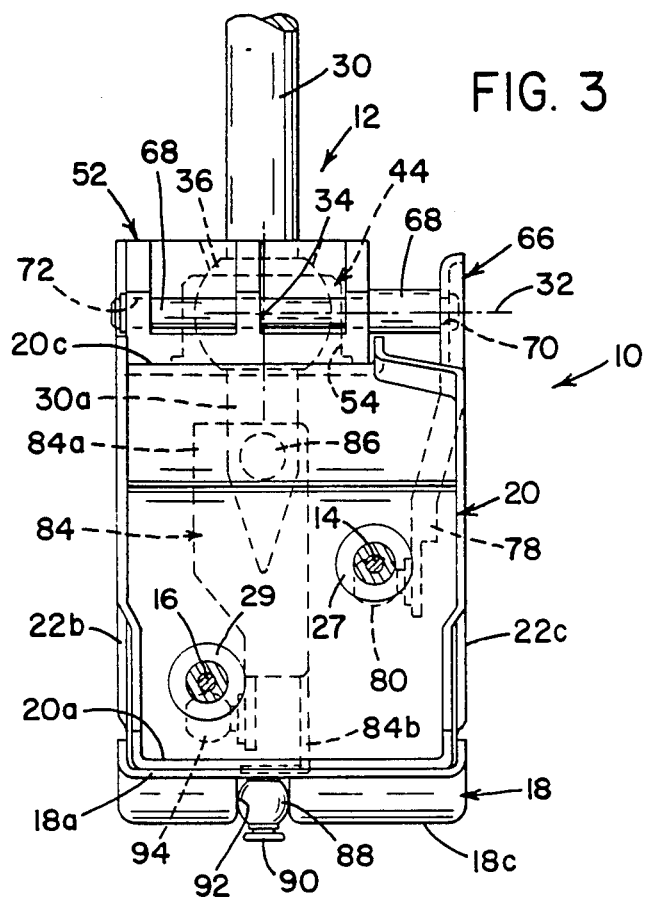
FIG. 3 is a front elevation view of the mechanism looking in the direction from left to right in FIG. 1.
Figure 4:
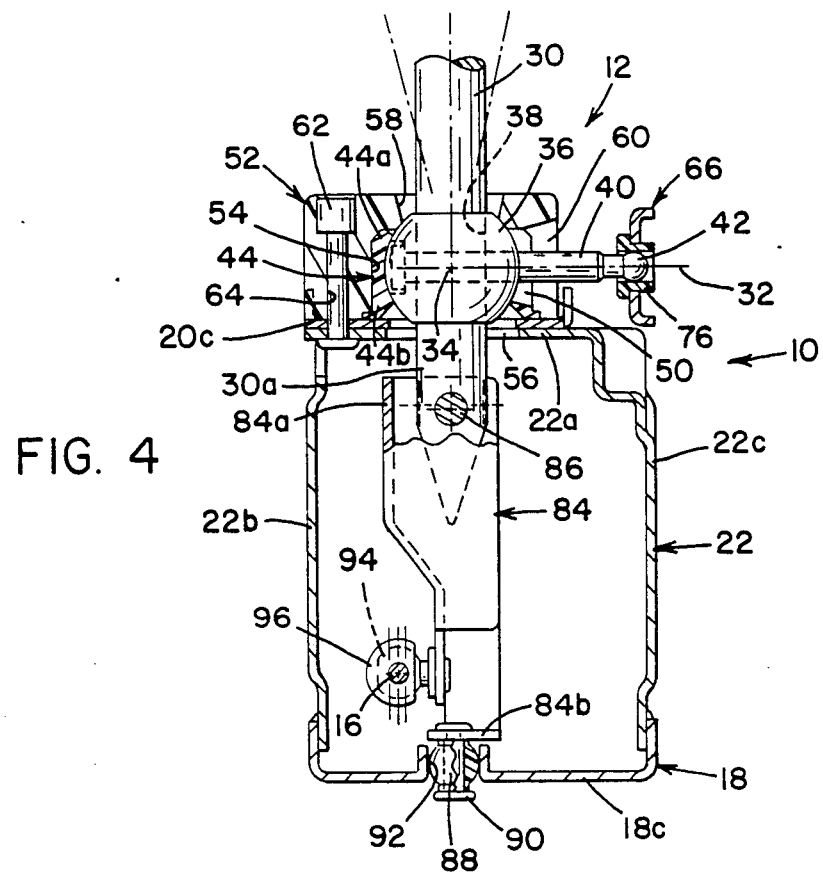
FIG. 4 is a sectional elevation view of the mechanism taken along line 4—4 in FIG. 1.
Figure 5:
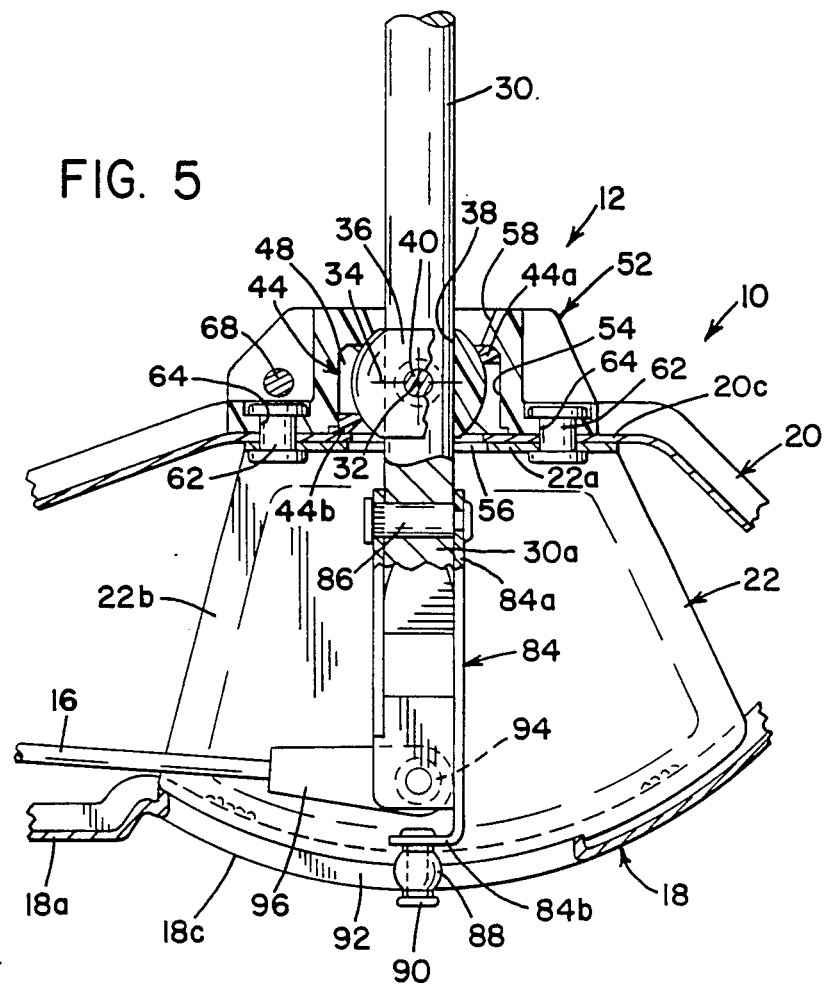
FIG. 5 is a sectional elevation view of the mechanism taken along line 5—5 in FIG. 2.
Figure 6:
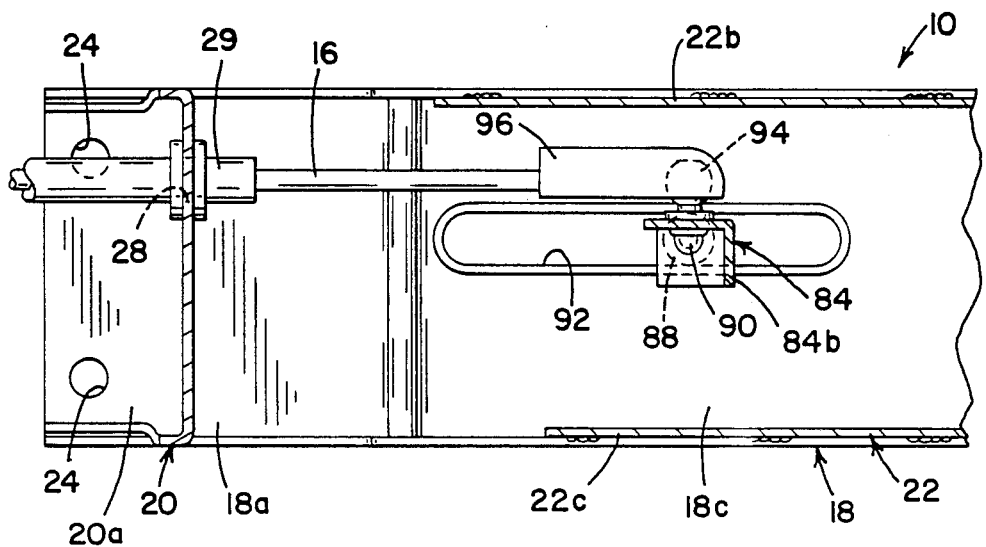
FIG. 6 is a plan view, partially in section, taken along line 6—6 in FIG. 1.

It will be appreciated in connection with gearshifting mechanisms of the character to which the present invention relates that the pair of actuator members or cables are reciprocated to achieve a shifting of gears in a vehicle transmission and that each available gear selection requires sequential displacement of gearshift lever 30 about axes 32 and 34. It is not believed necessary for an understanding of the present invention to describe each of the sequences of pivotal displacement of gearshift lever 30 to achieve the available gear ratios. However, for example, presuming the component parts as shown in FIGS. 1 and 3 to be in the neutral gear position, and without reference to shifting into a particular selectable gear ratio, gearshift lever 30 is first shifted in one direction or the other about axis 34 for pin 40 to pivot bellcrank 66 and thus reciprocate cable 14, and gearshift lever 30 is then pivoted in one direction or the other about axis 32 to reciprocate cable 16 attached to the lower end of link member 84.

Figure 8:
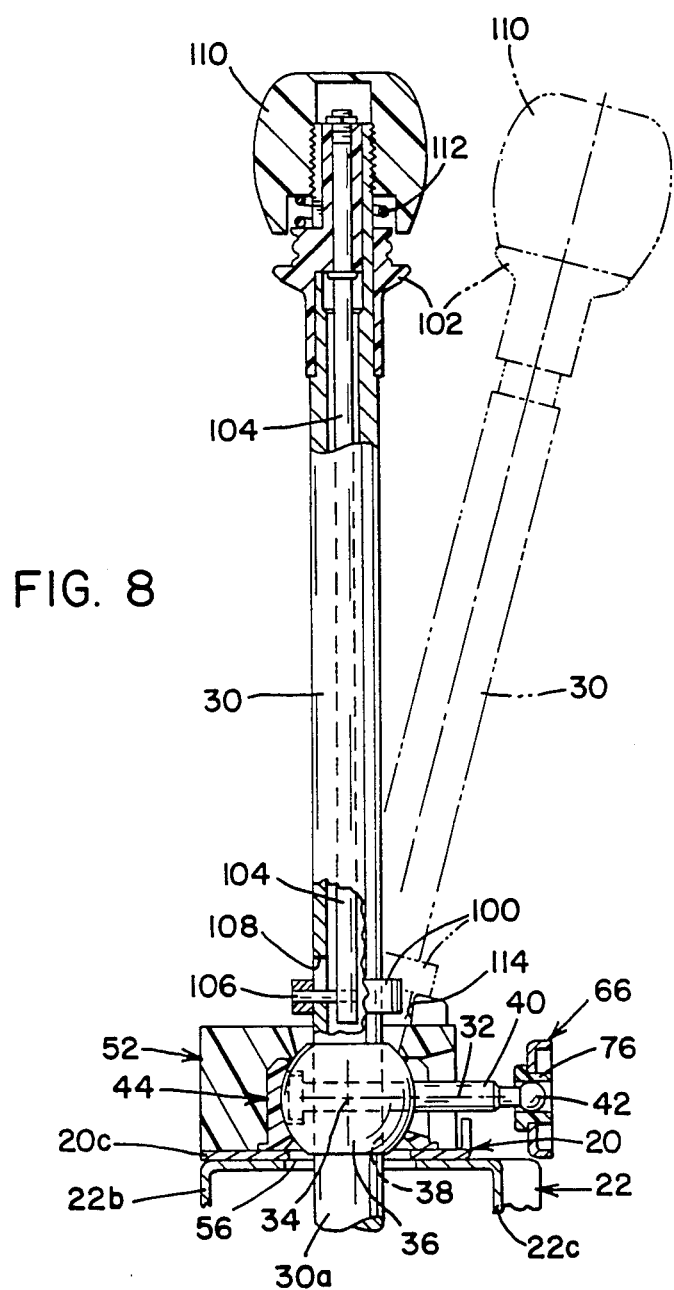
FIG. 8 a sectional elevation view of a portion of the gearshifting mechanism modified to provide a reverse lockout assembly.

Manual gearshifting mechanisms of the character to which the present invention is directed provide four or five forward gears and a reverse gear and, often, it is desired to provide the gearshift mechanism with a lockout arrangement to preclude accidental or unintended displacement of the gearshift lever into the reverse gear position. FIG. 8 illustrates a modification of the gearshift lever and ball and socket housing of the embodiment described hereinabove which provides the latter with a reverse lock-out arrangement. More particularly in this respect, gearshift lever 30 is tubular in this instance and supports a lock-out member 100 which is in the form of a collar surrounding and reciprocable along lever 30. Reciprocation of lock-out member 100 is achieved by providing the upper end of lever 30 with a reciprocable pull ring 102 connected to an actuating rod 104 which extends downwardly through lever 30. Collar 100 is staked to the lower end of rod 104 by means of a pin 106 which extends laterally through an axially extending slot 108 in lever 30. A gearshift knob 110 is attached to the upper end of gearshift lever 30, and pull ring 102 and rod 104 are reciprocable relative to knob 110 and lever 30 to reciprocate collar 100 relative to the lever. A coil spring 112 between knob 110 and pull ring 102 biases the latter and thus collar 100 downwardly to the solid line position of the parts shown in FIG. 8.

One side of the top of ball and socket housing member 52 is provided with a stop shoulder 114 and, presuming that the reverse gear position of gearshift lever 30 requires clockwise displacement of the lever to the broken line position shown in FIG. 8, it will be appreciated that shoulder 114 is positioned to engage lock-out member 100 when the latter is in its lower position relative to lever 30. It will likewise be appreciated that upward displacement of pull ring 102 pulls stop member 100 upwardly along lever 30 a distance sufficient for member 100 to clear shoulder 114, whereby lever 30 can be further pivoted clockwise in FIG. 8 and either into or out of the plane of FIG. 8 to the reverse gear position thereof. Upon displacement of gearshift lever 30 counterclockwise from the broken line position, spring 112 biases lock-out member 100 downwardly when the latter clears the upper edge of shoulder 114, thus to prevent accidental or unintentional return of the lever to the reverse gear position.

Figure 9:
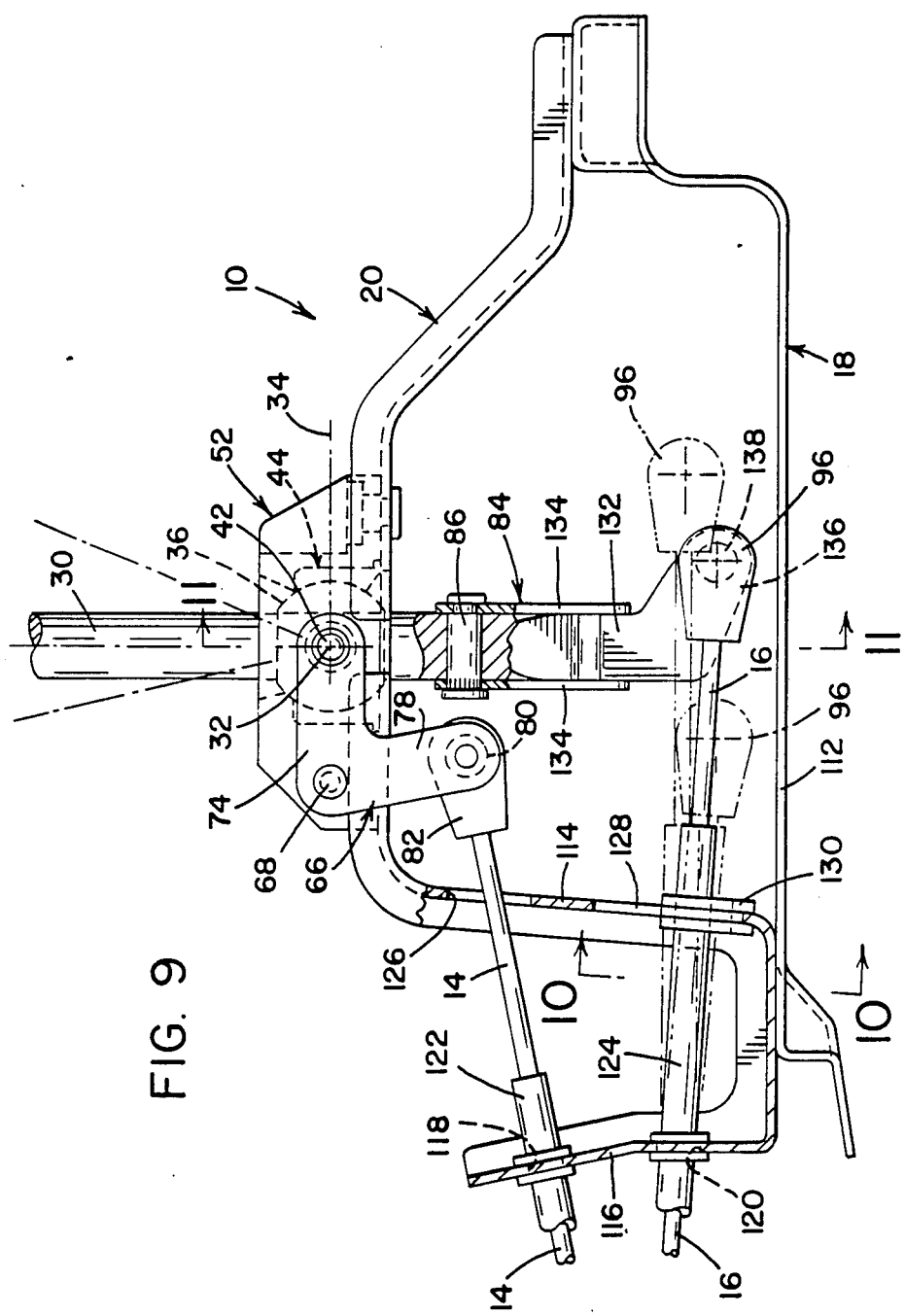
FIG. 9 is a side elevation view, partially in section, of another embodiment of a gearshifting mechanism in accordance with the present invention.
Figure 10:
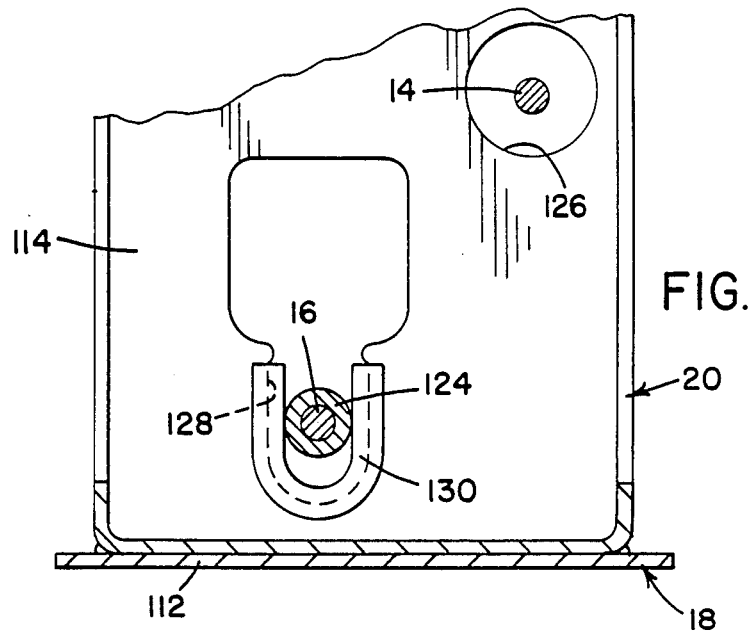
FIG. 10 is a sectional elevation view taken along line 10—10 in FIG. 9.
Figure 11:
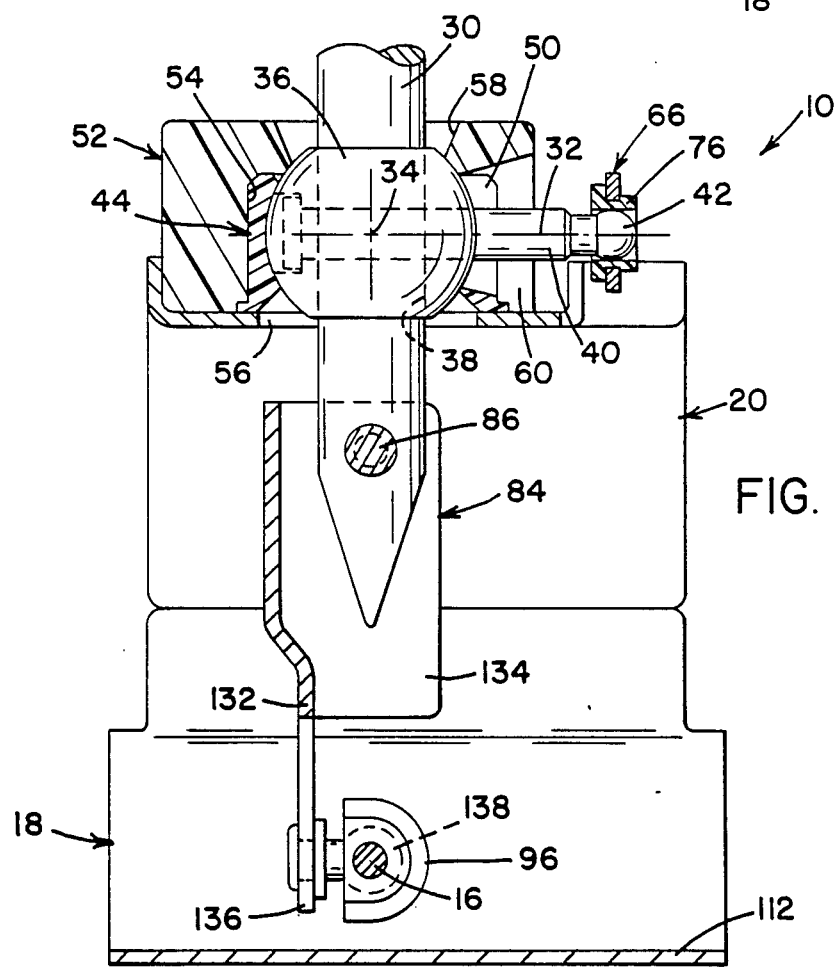
FIG. 11 a sectional elevation view taken along line 11—11 in FIG. 9.

FIGS. 9-11 illustrate a modification of the gearshift lever extension link arrangement by which cable 16 is maintained against lateral displacement in response to pivotal movement of gearshift lever 30 about axis 34. Like numerals are used in FIGS. 9-11 to designate component parts which correspond basically to the component parts of the mechanism described hereinabove in connection with FIGS. 1-7. In the embodiment illustrated in FIGS. 9-11, support structure 10 is modified for bottom member 18 to have a substantially planar bottom wall portion 112 and for top member 20 to have a first downwardly extending front wall portion 114 and a second, upwardly extending front wall portion 116 spaced forwardly of wall portion 114. Wall portion 116 is provided with openings 118 and 120 receiving cable guide components 122 and 124 for cables 14 and 16, respectively. Wall portion 114 includes an opening 126 through which cable 14 extends, and is further provided with a slot 128 receiving and supporting a U-shaped grommet 130. Cable guide component 124 for cable 16 extends rearwardly from wall portion 116 and through grommet 130 between the upwardly extending legs thereof. The cable guide component has a sliding fit with the legs of grommet 130, whereby the guide component is displaceable upwardly and downwardly relative to the grommet but is precluded by engagement with the grommet legs from lateral displacement relative thereto. Accordingly, as will be appreciated from the solid line and broken line positions shown in FIG. 9, guide component 124, is in effect pivotal vertically relative to the connection thereof with wall portion 116.

With further regard to the embodiment illustrated in FIGS. 9-11, gearshift extension link member 84 has its upper end pivotally connected to gearshift lever 30 by means of pin 86 as previously described, and is modified so as to eliminate the sliding interengagement between the lower end thereof and the bottom wall of the support structure. More particularly in this respect, web portion 132 of link member 84 extends downwardly below flanges 134 of the link member and thence rearwardly to provide a finger 136. A ball pin 138 is staked to finger 136 and receives socket member 96 of cable 16. While finger 136 extends rearwardly in the embodiment illustrated, such disposition is to accommodate the necessary displacement of cable 16 relative to wall portion 114 of the support structure, whereby it will be appreciated that, with other support structures or required cable displacements, finger 136 could be directly below or forwardly of the axis of gearshift lever 30.

It will be appreciated in connection with standard gearshifting movements of gearshift lever 30 that pivotal displacements of lever 30 about axis 34 take place with the gearshift lever in the vertical disposition shown in FIG. 9. In the present embodiment, the pivotal connection provided by link pin 86 together with the stiffness of cable 16 and the support thereof by guide component 124 as described above provides for pivotal displacements of gearshift lever 30 about axis 34 to be achieved without lateral displacement of the end of cable 16 connected to ball pin 138. More particularly in this respect, it will be appreciated that such stiffness of cable 16 and the support thereof by cable guide component 124 imposes a restraining force at the point of connection between cable 16 and link finger 136 as defined by ball pin 138 and socket member 96. Accordingly, in response to pivotal displacement of gearshift lever 30 about axis 34 and the corresponding lateral displacement of pivot pin 86 and thus the upper end of link member 84 from the position shown in FIG. 11, ball pin 138 pivots in socket 96 and socket 96 restrains lateral displacement of the ball pin and thus the lower end of link member 84 during such pivotal movement of the gearshift lever. Thus, cable 16 stays in alignment with guide component 124 so that the cable is displaced along a linear path in response to the subsequent pivotal displacement of gearshift lever 30 clockwise or counterclockwise in FIG. 9 about axis 32. It will be further appreciated that the sliding interengagement between cable guide component 124 and the legs of grommet 130 accommodates the vertical displacements of cable 16 which accompany both the lateral pivotal displacement of link member 84 in response to pivotal movement of gearshift lever 30 about axis 34 and the pivotal displacement of the link member about axis 32 in response to pivotal displacement of gearshift lever 30 about the latter axis.

While considerable emphasis has been placed on the preferred embodiments herein illustrated and described and the structures and structural interrelationships between the component parts thereof, it will be appreciated that other embodiments can be made and that many changes can be made in the preferred embodiments without departing from the principles of the present invention. In particular, it will be understood that the two arrangements for translating pivotal displacements of the gearshift lever into reciprocating displacements of the gearshift actuator cables are not interdependent. Accordingly, the use of a ball and socket joint to support the gearshift lever for pivotal displacement about orthogonal axes and a pin pivotal with the gearshift lever to actuate a ballcrank or similar member and thus translate such pivotal movement into reciprocating movement of one actuator cable does not necessitate attachment of the other cable to the gearshift lever through a pivotal link arrangement. Likewise, the advantages of the latter arrangement with respect to optimizing maintenance of a cable or other actuator against lateral displacement relative to the support can be realized in a gearshifting mechanism wherein pivotal support of the gearshifting lever and reciprocation of the other actuator is achieved other than by the ball and socket joint and pin arrangement illustrated herein. Further in connection with the latter, while it is preferred from the standpoint of economy and efficiency in operation to provide for the bellcrank actuating pin to be coaxial with one of the pivot axes of the gearshift lever, it will be appreciated that the pin could, for example, be mounted on the gearshift lever so as to be parallel to but offset from the pivot axis without departing from its ability to actuate the bellcrank. Still further, with regard to the pivotal link or gearshift lever extension member, it will be appreciated that arrangements could be devised to provide for the pivotal connection between the upper end of the link member and the gearshift lever to be coaxial with the longitudinally extending pivot axis of the gearshift lever, thus to totally eliminate lateral displacement of the corresponding actuator cable in response to lateral displacement of the gearshift lever about the longitudinal pivot axis.

The foregoing modifications of the preferred embodiments as well as other modifications and other embodiments of the invention will be obvious or suggested to those skilled in the art from the description of the preferred embodiments herein. Accordingly, it is to be distinctly understood that the foregoing descriptive matter is to be interpreted merely as illustrative of the present invention and not as a limitation.

Having thus described the invention, it is claimed:

1. A manually operable gearshifting mechanism for displacing a pair of transmission gear actuators comprising support means, a gearshift lever, means mounting said gearshift lever on said support means for pivotal movement about first and second orthogonal axes, means to reciprocate one of said gear actuators in response to pivotal movement of said gearshift lever about said first axis, pin means on said gearshift lever parallel to said first axis, and means actuated by said pin means to reciprocate the other of said gear actuators in response to pivotal movement of said gearshift lever a given angular distance about said second axis, said means to reciprocate said one gear actuator including means responsive to said pivotal movement of said gearshift lever said given angular distance about said second axis to restrain displacement of said one gear actuator to an angular distance less than said given angular distance, said displacement of said one gear actuator being laterally of the direction of reciprocating movement thereof.

2. A gearshifting mechanism according to claim 1, wherein said means responsive to pivotal movement of said gearshift lever includes a link having a first end connected to said gearshift lever for pivotal movement about an axis parallel to said second axis, and a second end supported for sliding displacement relative to said support means in the direction of reciprocating movement of said one gear actuator, said one gear actuator being connected to said link between said ends thereof.

3. A gearshifting mechanism according to claim 2, wherein said support means includes guide means extending in said direction of reciprocating movement of said one gear actuator, and said second end of said link includes follower means slidably engaging said guide means.

4. A gearshifting mechanism according to claim 3, and selectively operable means to releaseably limit pivotal displacement of said gearshift lever in one direction about said second axis.

5. A gearshifting mechanism according to claim 1, wherein said means mounting said gearshift lever on said support means includes ball means on said gearshift lever and socket means on said support means.

6. A gearshifting mechanism according to claim 5, wherein said pin means extends from said ball means coaxial with said first axis.

7. A gearshifting mechanism according to claim 6, wherein said support means includes laterally opposite sides and said means actuated by said pin means includes second lever means pivotally mounted on said support means adjacent one of said sides.

8. A gearshifting mechanism according to claim 7, and selectively operable means to releaseably limit pivotal displacement of said gearshift lever in one direction about said second axis.

9. A gearshifting mechanism according to claim 7, wherein said second lever means is mounted on said support means for pivotal movement about a lever axis extending in the direction between said sides, said second lever means including a first leg engaging said pin means at a location spaced from said lever axis and a second leg connected to said other gear actuator at a location spaced from said lever axis and said pin means.

10. A gearshifting mechanism according to claim 7, wherein said means responsive to pivotal movement of said gearshift lever includes a link having a first end connected to said gearshift lever for pivotal movement about an axis parallel to said second axis, and a second end supported for sliding displacement relative to said support means in the direction of reciprocating movement of said one gear actuator, said one gear actuator being connected to said link between said ends thereof.

11. A gearshifting mechanism according to claim 10, wherein said support means includes guide means extending in said direction of reciprocating movement of said one gear actuator, and said second end of said link includes follower means slidably engaging said guide means.

12. A gearshifting mechanism according to claim 11, wherein said second lever means is mounted on said support means for pivotal movement about a lever axis extending in the direction between said sides, said second lever means including a first leg engaging with said pin means at a location spaced from said lever axis and a second leg connected to said other gear actuator at a location spaced from said lever axis and said pin means.

13. A gearshifting mechanism according to claim 12, and selectively operable means to releaseably limit pivotal displacement of said gearshift lever in one direction about said second axis.

14. A gearshifting mechanism according to claim 7, wherein said means responsive to pivotal movement of said gearshift lever includes a link having a first end connected to said gearshift lever for pivotal movement about a link axis parallel to said second axis, and a second end spaced from said link axis, said one gear actuator being connected to said second end of said link.

15. A gearshifting mechanism according to claim 14, wherein said support means includes longitudinally opposite ends, guide means for said one gear actuator on one of said opposite ends of said suppoort means and extending in said direction of reciprocating movement of said one gear actuator, and said one end of said support means supporting said guide means against displacement in the direction between said laterally opposite sides.

16. A gearshifting mechanism according to claim 1, wherein said means responsive to pivotal movement of said gearshift lever includes a link having a first end connected to said gearshift lever for pivotal movement about a link axis parallel to said second axis, and a second end spaced from said link axis, said one gear actuator being connected to said second end of said link.

17. A gearshifting mechanism according to claim 16, wherein said suport means includes longitudinally opposite ends, guide means for said one gear actuator on one of said opposite ends of said support means and extending in said direction of reciprocating movement of said one gear actuator, and said one end of said support means supporting said guide means against displacement in the direction between said laterally opposite sides.

18. A manually operable gearshifting mechanism for displacing a pair of transmission gear actuators comprising support means having longitudinally opposite ends, a gearshift lever mounted on said support means for pivotal movement about first and second axes respectively extending laterally and longitudinally of said support means, means connecting one of said pair of gear actuators to said lever at a point of connection spaced from said first axis for pivotal movement of said gearshift lever about said first axis to reciprocate said one gear actuator longitudinally of said support means, means to translate pivotal movement of said gearshift lever a given angular distance about said second axis to longitudinal reciprocation of the other of said pair of gear actuators, and said means connecting said one actuator to said gearshift lever being operable in response to pivotal movement of said gearshift lever said given angular distance about said second axis to restrain displacement of said point of connection to an angular distance less than said given angular distance, said displacement of said point of connection being laterally of the direction of reciprocation of said one actuator.

19. A gearshifting mechanism according to claim 18, wherein said means connecting said one gear actuator to said gearshift lever includes a link pivotally interconnected with said gearshift lever means.

20. A gearshifting mechanism according to claim 19, wherein said link is interconnected with said gearshift lever and said support means for pivotal displacement relative thereto laterally of said support means.

21. A gearshifting mechanism according to claim 20, wherein said link interengages with said support means for longitudinal sliding displacement relative thereto.

22. A gearshifting mechanism according to claim 21, wherein said one gear actuator is connected to said link between said gearshift lever and said support means.

23. A gearshifting mechanism according to claim 19, wherein said suport means has upper and lower ends and said gearshift lever is mounted on said support means for said first and second axes to be spaced above said lower end, said link has first and second ends, said first end being interconnected with said gear shift lever for pivotal displacement of said link laterally relative to said lever and said second end being adjacent said lower end of said support means, and said one gear actuator being connected to said second end of said link.

24. A gearshifting mechanism according to claim 23, wherein said first end of said link is pivotally connected to said lever at an axis parallel to said second axis.

25. A gearshifting mechanism according to claim 24, wherein said support means has longitudinally opposite ends and laterally opposite sides, and guide means for said one gear actuator on one of said longtitudinally opposite ends of said support means and extending longitudinally of said support means, said suport means supporting said guide means for displacement in the direction between said upper and lower ends and against displacement in the direction between said opposite sides.

26. A gearshifting mechanism according to claim 25, wherein said one of said opposite ends of said suport means includes longitudinally spaced apart wall means, said guide means extending between said wall means and having first and second end portions, said second end portion of said guide means being closest to said second end of said link, said first end portion being pivotally supported by one of said wall means, and said second end portion being slidably supported by grommet means on the other of said wall means.

27. A gearshifting mechanism according to claim 26, wherein said axis between said first end of said link and said lever is spaced below said second axis.

* * * * *